United States Patent
Deeg

(10) Patent No.: US 10,265,781 B2
(45) Date of Patent: Apr. 23, 2019

(54) SINGLE-LIP DEEP HOLE DRILL

(71) Applicant: botek Praezisionsbohrtechnik GmbH, Riederich (DE)

(72) Inventor: Juergen Deeg, Metzingen (DE)

(73) Assignee: botek Praezisionsbohrtechnik GmbH, Riederich (DE)

( * ) Notice: Subject to any disclaimer, the term of this patent is extended or adjusted under 35 U.S.C. 154(b) by 123 days.

(21) Appl. No.: 15/549,691

(22) PCT Filed: Feb. 10, 2016

(86) PCT No.: PCT/EP2016/052823
§ 371 (c)(1),
(2) Date: Aug. 9, 2017

(87) PCT Pub. No.: WO2016/128462
PCT Pub. Date: Aug. 18, 2016

(65) Prior Publication Data
US 2018/0029142 A1    Feb. 1, 2018

(30) Foreign Application Priority Data
Feb. 13, 2015  (DE) .................... 20 2015 001 069 U

(51) Int. Cl.
*B23B 41/02* (2006.01)
*B23B 51/04* (2006.01)

(52) U.S. Cl.
CPC .......... *B23B 41/02* (2013.01); *B23B 51/0486* (2013.01); *B23B 2231/24* (2013.01);
(Continued)

(58) Field of Classification Search
CPC ............... B23B 41/02; B23B 51/0486; B23B 2251/201; B23B 2251/424; Y10S 408/705
See application file for complete search history.

(56) References Cited

U.S. PATENT DOCUMENTS 3,054,308 A * 9/1962 Larry .................. B23B 51/0486
                                               408/226
3,071,030 A * 1/1963 Larry .................... B23B 49/023
                                               408/72 B
(Continued)

FOREIGN PATENT DOCUMENTS

DE         3314718        10/1984
DE    102009024256 A1 *  12/2010   ......... B23B 51/0486
(Continued)

OTHER PUBLICATIONS

International Search Report and Written Opinion Form PCT/ISA/220, International Application No. PCT/EP2016/052823, pp. 1-10, International Filing Date Feb. 10, 2016, dated Apr. 20, 2016.

*Primary Examiner* — Eric A Gates
(74) *Attorney, Agent, or Firm* — Bond Schoeneck & King, PLLC; George McGuire

(57) ABSTRACT

The invention relates to a single-lip deep hole drill comprising a drill head, wherein the drill head has a drill diameter, a blade and a channel for chip removal, wherein the blade extends outwards from a rotational axis up to the perimeter of the drill head, wherein the blade has a cutting surface and wherein the channel is bordered by a chip forming surface, wherein the chip forming surface has two sections such that a first section of the chip forming surface extends in the radial direction from the rotational axis up to a first diameter, a second section of the chip forming surface connects to the first section in the radial direction, the first section is positioned above the cutting surface, and the second section is positioned nearer to the cutting surface than the first section.

12 Claims, 5 Drawing Sheets

(52) U.S. Cl.
CPC ... *B23B 2251/201* (2013.01); *B23B 2251/406* (2013.01); *B23B 2251/424* (2013.01); *B23B 2251/48* (2013.01); *B23B 2251/56* (2013.01); *Y10T 408/45* (2015.01); *Y10T 408/9095* (2015.01)

(56) References Cited

U.S. PATENT DOCUMENTS

| | | | | |
|---|---|---|---|---|
| 4,092,083 | A | * | 5/1978 | Larry ................. B23B 51/0486 407/11 |
| 4,395,169 | A | * | 7/1983 | Kashiwagi .......... B23B 51/0486 408/144 |
| 5,443,585 | A | | 8/1995 | Kawase et al. |

FOREIGN PATENT DOCUMENTS

| | | | |
|---|---|---|---|
| DE | 102012016660 | | 2/2014 |
| EP | 89123 A | * | 9/1983 |
| JP | S629811 | | 1/1987 |
| JP | S6234712 | | 2/1987 |
| JP | 03245914 A | * | 11/1991 |
| RU | 2101141 C1 | * | 1/1998 |
| WO | WO-2009157606 A1 | * | 12/2009 ......... B23B 31/1075 |

\* cited by examiner

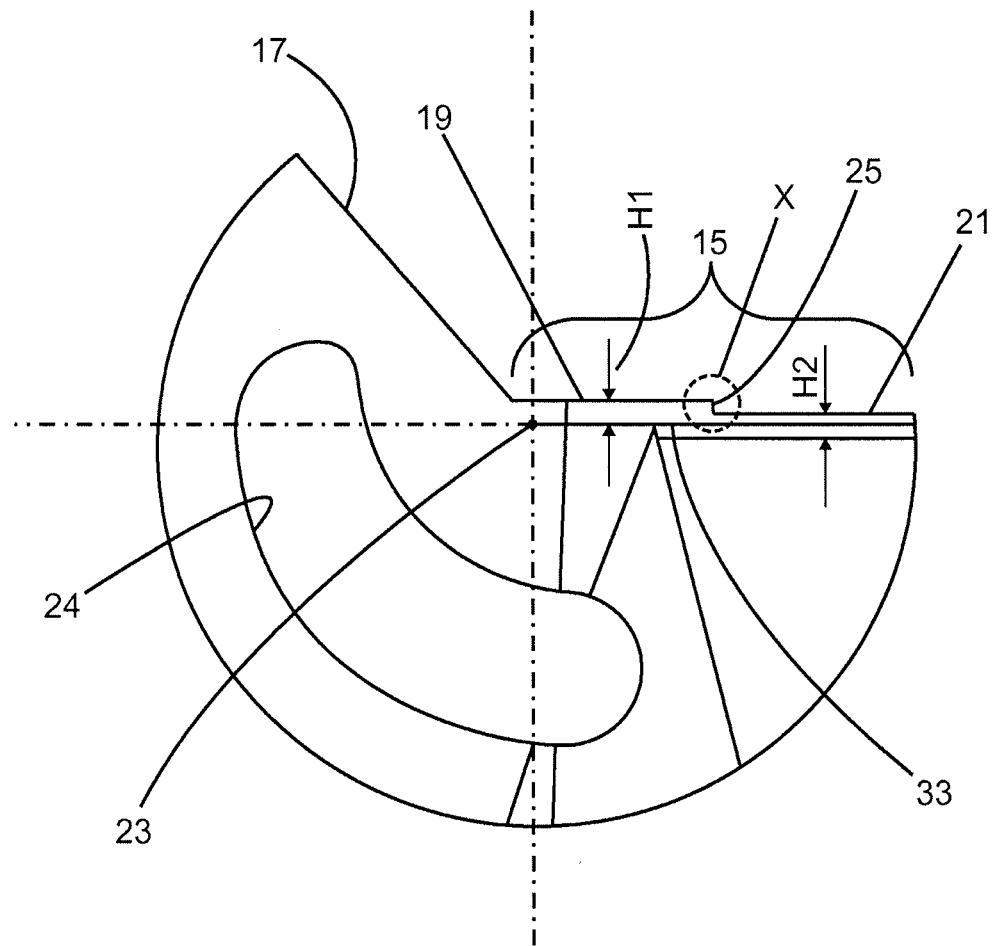
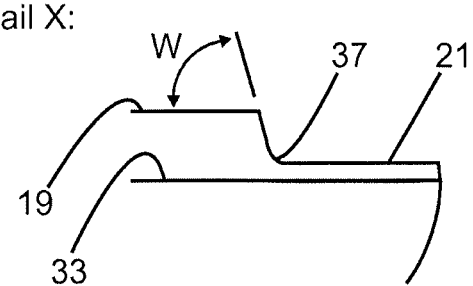
Fig. 5

SINGLE-LIP DEEP HOLE DRILL

CROSS-REFERENCE TO RELATED APPLICATIONS

This application is the United States National Stage Application under 35 U.S.C. 371 of PCT Application No. PCT/EP2016/052823, filed February 10, 201, which claims priority to German Application No. 20 2015 001 069.5, filed Feb. 13, 2015, the entire disclosure of each of which is incorporated herein by reference.

BACKGROUND OF THE INVENTION

The present invention relates to a deep-hole gundrill that is especially suitable for machining materials that produce long chips.

Deep-hole gundrills, also referred to as gundrills below, are known in a wide range of designs from the prior art. Reference is made to VDI Standards 3210 and 3208 and DE 10 2012 016 660 A1 of the applicant, for example. In general, there is always an effort to improve the capability, machining accuracy, and process reliability of deep-hole drills. The latter requires a short chip in order to ensure that the chips are transported out of the bore. In addition, the cutting force or the energy required for drilling should be minimized in order to reduce the load on the drill shank and DE 10 2012 016 660 A1, deep-hole gundrills and the special characteristics thereof are described. In particular, paragraphs [0002] to [0012] of DE 10 2012 016 660 A1 are hereby incorporated into the present application by reference.

As already known from DE 10 2012 016 660 A1, the rake angle of deep-hole gundrills is typically 0°. Deep-hole gundrills having a rake angle of >0° are also known from the prior art. One advantage of a rake angle of 0° is that said rake angle is simple to produce by grinding. However, comparatively high cutting forces occur during machining. As a result, the bore can laterally deviate. This lateral deviation is also called "bore deviation".

In addition, the possibility of influencing the forming of chips and therefore also the chip length is limited. When materials that produce long chips, such as high-quality and therefore also tough steel, are machined, this leads to problems especially at high feed rates and therefore limits productivity. This applies particularly to bores having a high ratio of length to diameter.

If deep bores are intended to be produced in materials that produce long chips, it is in accordance with the prior art to provide chip splitters and/or chip formers on the tool in order to minimize the chip size and thus ensure reliable transport of chips out of the bore. Chip splitters have an interrupted or curved blade. This has the disadvantage of expensive reflects the cutting edge, the bottom of the bore has an interrupted and/or curved shape when deep-hole gundrills having a chip splitter are used. This is often undesired.

Chip formers generally cause a rise in the feed forces and cutting forces, which can negatively affect the bore deviation.

Therefore, the present invention addresses the problem of providing a deep-hole gundrill that produces a short chip and therefore ensures process reliability even at high feed rates. In addition, the forces and torques acting on the drill head during machining are intended to be small so that the deviation of the bore is minimized and a long tool life is ensured.

Furthermore, the drive power required for drilling is intended to be low and the deep-hole gundrill according to the invention is intended to be relatively simple to produce and to regrind.

Said problem is solved by a deep-hole gundrill having the features of claim 1.

The chip forming surface according to the invention is flat but has two different plateaus with respect to the rake surface. The first section, which lies radially further inside, has a plateau lying further above the rake surface than the second section, which is formed radially further outside on the drill head. This design of the chip forming surface according to the invention has several positive effects:

The stepped chip forming surface according to the invention is relatively simple to produce by grinding, because the first section and the second section are flat faces that extend adjacently to each other in the direction of the rotational axis. If desired, said two sections can even be produced in one grinding process by means of a contoured grinding disk.

Furthermore, the step between the rake surface and the outer second section of the chip forming surface is relatively low, and therefore the chip produced by the outer cutting edge in this radially outer region is slightly raised on said step. The drive power required for this purpose is relatively low, even though the second section is arranged radially outside. Consequently, the torsional and bending loads resulting therefrom and the required drive power of the deep-hole gundrill according to the invention are also relatively low. This has a positive effect on the straightness of the bore and the feed rate.

The step between the rake surface and the first section, which is arranged radially further inside, is considerably higher, and therefore considerable deformation work is performed on the chip here, which deformation work causes the chip to break. Nevertheless, the torque resulting therefrom is relatively low, because the first section is located in close proximity to the rotational axis of the drill head.

The plateaus of the chip forming surface in the first section and the second section, which plateaus are offset from each other and from the rake surface, additionally cause the chip to be deflected toward the second wall of the flute. When the chip hits said wall, the chip is plastically deformed again and therefore finally breaks into the desired short pieces.

This results in a very short-breaking chip, a low cutting force, and high capability of the deep-hole gundrill according to the invention. In addition, the deep-hole gundrill according to the invention is relatively simple to produce. Another reason for this is that the chip forming surface consists of flat sections arranged adjacently to each other. In addition, the rake surface is flat and is positioned in close proximity to or even directly at the center of the drill head. This facilitates not only the grinding of the rake surface but also the grinding of a contoured tip of the drill head.

In an advantageous embodiment of the invention, it is provided that the second section lies at the height of the rake surface or slightly higher than the rake surface. Specifically, the outer part of the chip is then only slightly raised behind the blade, and this requires only small forces.

According to the invention, the two sections of the chip forming surface are designed as flat surfaces extending adjacently to each other, which simplifies the production.

It has proven advantageous if the distance $H_1$ of the first section from the rake surface is more than twice as large as the distance $H_2$ of the second section from the rake surface. A ratio of 4:1 has proven to be an effective compromise between a low cutting force or low drive power and, at the same time, high deformation forces acting on the chip. Consequently, the chip breaks so as to be short and nevertheless the risk of overloading of the deep-hole gundrill or of premature wear is minimized.

It has also proven to be advantageous if the rake angle of the rake surface equals 0° and the rake surface of the drill head extends through the rotational axis of the drill head or slightly below the rotational axis. In other words, the rake surface can be arranged at or slightly below the center of the drill head. For example, in the case of a deep-hole gundrill having a drill diameter of 6 mm, the rake surface can lie up to $2/100$ mm below the center. In comparison with deep-hole gundrills having a chip breaker, the rake surface lies considerably closer to or at the center in the case of the deep-hole gundrill according to the invention.

In the case of deep-hole gundrills having a chip breaker that are known from the prior art, the rake surface on the outer cutting edge lies considerably below the center. The rake surface on the inner cutting edge lies in the region of the rotational axis at the center. Such cutting-edge geometry is usually considerably more expensive to produce and more difficult to regrind than the cutting-edge geometry according to the invention.

The tip of the deep-hole gundrill according to the invention can be designed in accordance with the requirements of the customer within a wide range. Because the rake surface lies at the center or only slightly below the center, customer-specific geometries of the bottom of the bore can be realized easily and precisely. This is a further advantage of the deep-hole gundrill according to the invention. An angle W is less than 90° so that the chip slides easily over a step between the first section and the second section without jamming. The smaller the angle W, the more easily the chip slides over said step.

It has also proven advantageous if the first diameter $D_1$, which defines the transition between the first section and the second section, is approximately equal to half of the diameter of the drill head. In the case of this division of the chip forming surface, a good compromise has been achieved between large deformation work of the chip and, at the same time, low drive power.

Likewise in the case of the deep-hole gundrill according to the invention, a chip breaker can be formed on the rake surface in a manner known per se. Said chip breaker can be designed, for example, as a small chamfer, the front end of said chamfer being positioned somewhat (approximately $1/100$ mm to $2/100$ mm) below the center of the drill head.

In a manner known per se, the deep-hole gundrill according to the invention has a shank, the flute being formed in the drill head and at least in part in the shank.

The drill head according to the invention advantageously consists of carbide and, if necessary, is coated. The shank having the driver can also consist of carbide, the tool then being a solid carbide tool. Alternatively, the shank, having the flute, and a clamping sleeve can consist of a different material, such as steel.

Further advantages and advantageous embodiments of the invention can be found in the drawings below, the description thereof, and the claims (for protection).

All features described in the drawings, in the description of the drawings and in the claims can be essential to the invention in isolation and in any combination with each other.

DRAWINGS

In the drawings:

FIG. 5 is the view according to FIG. 2 showing further dimensions.

DESCRIPTION OF THE EMBODIMENT

Figure 1:
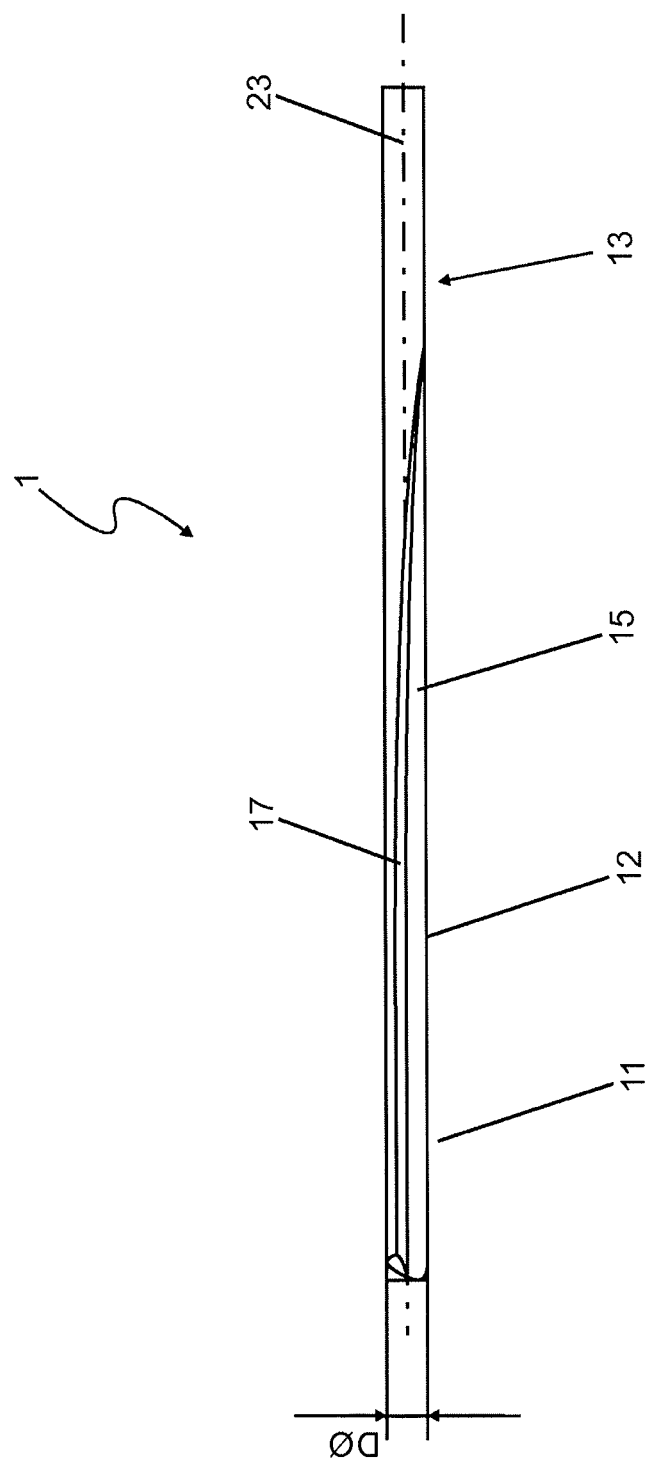
FIG. 1 is a schematic view of a deep-hole gundrill.

FIG. 1 shows a deep-hole gundrill 1 schematically in somewhat simplified form. The deep-hole gundrill 1 consists of a drill head 11, a profiled shank 12, and a driver 13. By means of the driver 13, the deep-hole drill 1 is held in a deep-hole drilling machine (not shown). The drill head according to the invention can be used in the case of solid carbide tools and in the case of "assembled" tools in which the drill head, a profiled tube shank, and a clamping sleeve are soldered to each other.

A rotational axis or the center of the drill head 11 has the reference sign 23. A flute is formed in the drill head 11 and in the profiled shank 12. The flute is delimited by a chip forming surface 15 and a wall 17.

The deep-hole drill 1 according to the invention can have a drill diameter D of 6.1 mm and can be used to drill through a transmission shaft made of high-strength steel at a length of 350 mm. This task is very demanding in terms of production because high-strength steels produce long chips and are tough and, furthermore, high requirements are placed on the geometry (diameter and straightness) of the bore. In addition, in automated drilling, process reliability and therefore a short chip are extremely important.

To achieve this, the chip forming surface 15 according to the invention has two sections 19 and 21. A first section 19 is arranged radially further inside, while the second section 21 is arranged radially further outside.

A cooling lubricant channel 24, which is also referred to as a "kidney", can be seen at the tip of the drill head 11. Said cooling lubricant channel 24 extends over the entire length of the deep-hole drill 1 in a manner known per se. Cooling lubricant is guided to the tip of the deep-hole drill 1 via the cooling lubricant channel 24. The cooling lubricant cools the drill tip and, at the same time, conveys the chips produced by the drill head 11 through the flute 15 toward the clamping sleeve 13.

Figure 2:
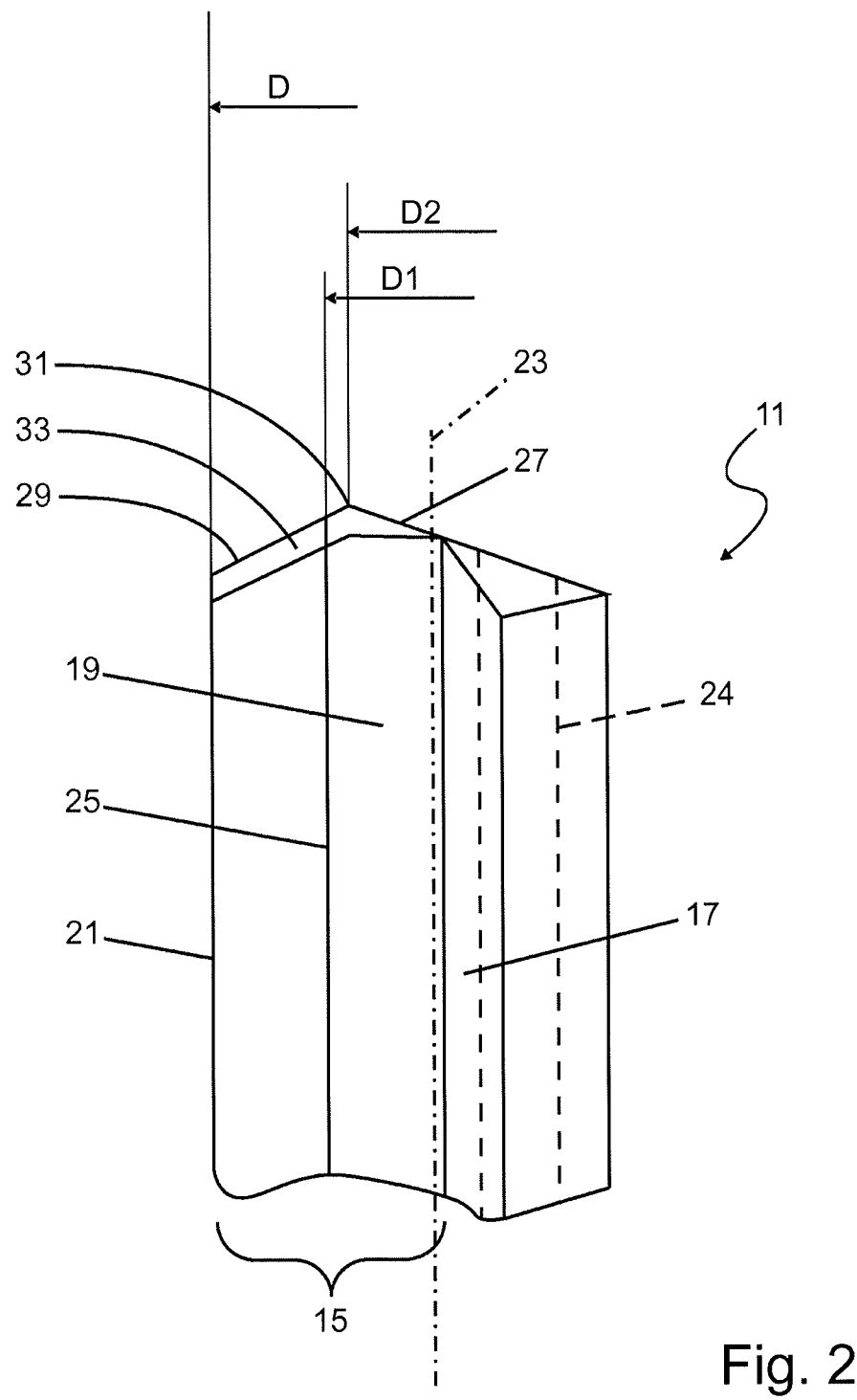
FIG. 2 is a view of a drill head according to the invention from above.

FIG. 2 is a schematic view of a drill head according to the invention from above. The center of the drill head or the rotational axis of the drill head 11 is provided with the reference sign 23.

As already mentioned, the flute is delimited by a wall 17 and the two-part chip forming surface 15. The two sections of the chip forming surface 15 (see FIG. 1) have the reference signs 19 and 21. The first section, which is arranged radially further inside is labeled as 19. The second section, which adjoins the first section 19 outwardly in the radial direction, is labeled as 21.

In a manner known per se, the cutting edge of the drill head 11 consists of an inner cutting edge 27 and an outer cutting edge 29, which form a rotational tip 31 at the point of intersection thereof. The geometry of the drill head according to the invention is independent of the shape of the tip of the drill head.

In the embodiment shown as an example, the outer cutting edge 29 extends at an angle of 30° relative to an orthogonal to the rotational axis 23. The inner cutting edge 29 extends at an angle of 20° relative to an orthogonal to the rotational axis 23. In short, the example involves a 30/20 nose grind.

A cutting-edge tip 31, which is positioned eccentrically with respect to the rotational axis 23, is formed between the inner cutting edge 27 and the outer cutting edge 29. The diameter at which the cutting-edge tip 31 revolves when the drill head 11 according to the invention rotates about the rotational axis 23 is labeled as $D_2$ in FIG. 2.

The step between the first section 19 and the second section 21 of the chip forming surface 15 moves along a circular path about the rotational axis 23 when the drill head 11 is set into rotation. This diameter is labeled as $D_1$ in FIG. 2.

In this embodiment, the cutting-edge tip 32 is arranged at a smaller diameter than the step between the first section 19 and the second section 21. This is not necessary. It is also possible for the drill head 11 not to have a pronounced tip.

The common rake surface 33 consisting of the inner cutting edge 27 and the outer cutting edge 29 has the reference sign 33. The rake surface 33 is located in a plane that extends either through or slightly below the rotational axis 23 of the drill head 11. The distance between the rake surface 33 and the rotational axis 23 must be small enough that no pin is left standing at the center of the bore.

Figure 3:
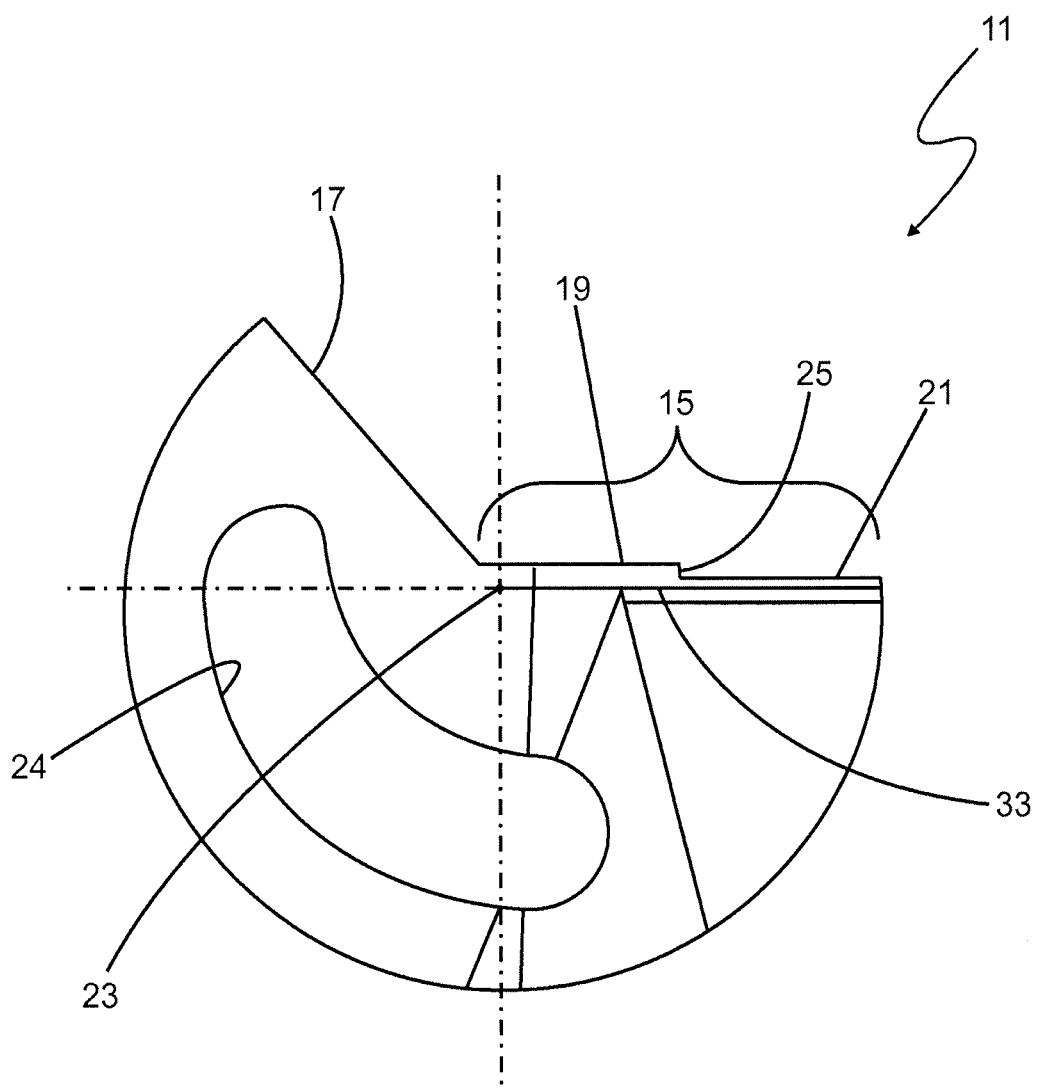
FIG. 3 is a view of a drill head according to the invention from the front.

FIG. 3 is a view of the drill head 11 according to the invention from the front. The same components are provided with the same reference signs.

The center of the drill head 11 or the rotational axis is shown as a point having the reference sign 23 in FIG. 3. In this view from the front, the cooling lubricant channel 24, the wall 17, and the stepped chip forming surface 15 having the sections 19 and 21 are clear.

In FIG. 3, it is clear that the flat rake surface 33 extends approximately through the center or the rotational axis 23 of the drill head 11. The rake surface 33 can extend exactly through the rotational axis 23 or slightly below the rotational axis 23. In the case of a drill diameter of 6.1 mm, the rake surface 33 can extend up to $2/100$ mm below the rotational axis 23.

Furthermore, it is clear that the sections 19 and 21 of the chip forming surface 15 have different heights with respect to the rake surface 33. The first section 19 arranged radially inside is considerably higher than the second section 21. This height difference results in a step 25 between the two sections 19 and 21.

Observing FIGS. 2 and 3 together, it is also clear that the tip of the drill head, including the flute having the wall 17 and the stepped chip forming surface 15, has only flat surfaces, which can be produced in a simple manner and with very high repeat accuracy by grinding. In other words, the drill head 11 according to the invention not only can be produced effectively and with process reliability but also can be reground relatively simply and with consistently high quality. This is especially important if the regrinding occurs not at a site of the manufacturer but at a site of the user of the deep-hole drill, because typically only relatively simple grinding devices are available there.

Figure 4:
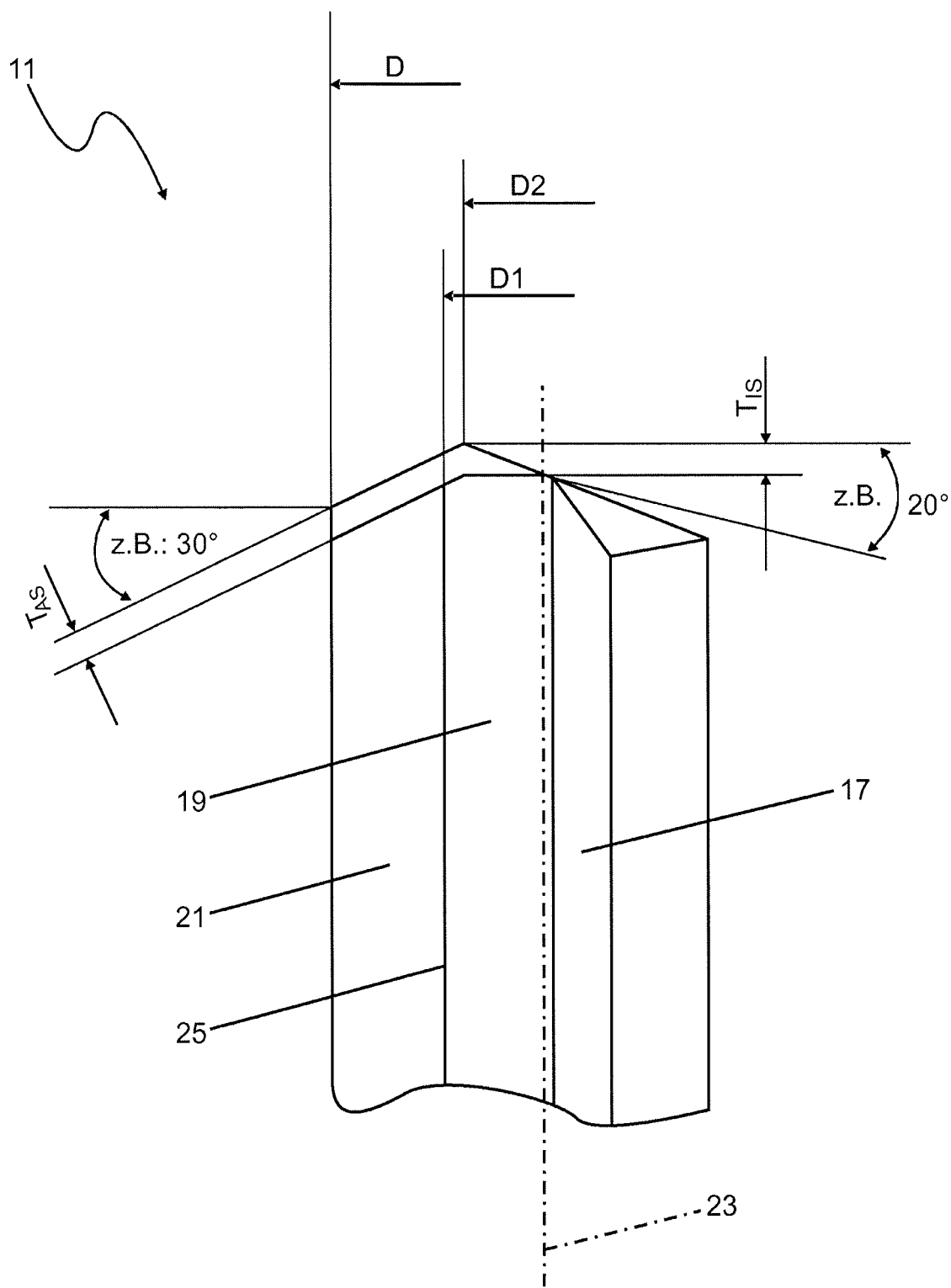
FIG. 4 is the view according to FIG. 2 showing further dimensions.

FIGS. 4 and 5 correspond to FIGS. 2 and 3. However, more extension lines and dimensions are incorporated in FIGS. 4 and 5, at the expense of clarity.

The dimensions incorporated in FIGS. 4 and 5 are largely self-explanatory. The following values have proven effective for a deep-hole drill according to the invention that has a drill diameter of 6.1 mm and is intended for making a bore in a transmission shaft made of high-strength steel:
Rake angle γ: 0°
Rake surface 33: at or slightly below the center
$D_1$: 3 mm
Length of the rake surface at the outer cutting edge $T_{AS}$: 0.8 mm
Length of the rake surface at the inner cutting edge $T_{IS}$: 0.8 mm
$H_1$ (distance between the rake surface 33 or the rotational axis 23 and the first section 19 of the chip forming surface 15): 0.2 mm
$H_2$ (distance between the rake surface 33 and the second section 21 of the chip forming surface 15): 0.05 mm
Radius 37 at the transition between the sections 19 and 21 of the chip forming surface: 0.05 mm
Angle W at the step 25 between the sections 19 and 21 of the chip forming surface: 80°
In the case of different bore diameters, these values can be adapted accordingly.

What is claimed is:

1. Deep-hole gundrill comprising a drill head, the drill head having a rotational axis, a drilling diameter (D), a cutting edge, and a flute for chip removal, the cutting edge extending outwards from the or approximately from the rotational axis up to the periphery of the drill head, the cutting edge having a flat rake surface, and the flute being delimited by a chip forming surface and a wall, characterized in that the chip forming surface has, with respect to the rake surface, two different sections formed as plateaus having flat surfaces, in that a first section of the chip forming surface lies radially inside and in close proximity to the rotational axis, in that a second section of the chip forming surface lies radially outside and adjoins the first section, in that the first section of the chip forming surface and the wall of the flute transition directly into each other, in that the first section lies above the rake surface in a view of the drill head from the front, and in that the second section lies closer to the rake surface than the first section does in a view of the drill head from the front.

2. Deep-hole gundrill according to claim 1, characterized in that the second section lies at least at the same height as the rake surface.

3. Deep-hole gundrill according to claim 1, characterized in that the first section lies at least twice as far above the rake surface as the second section does.

4. Deep-hole gundrill according to claim 1, characterized in that the rotational axis of the drill head extends approximately through a rake surface.

5. Deep-hole gundrill according to claim 1, characterized in that the angle W at a step between the sections of the chip forming surface has a value of between 55° and 90°.

6. Deep-hole gundrill according to claim 1, characterized in that the first diameter ($D_1$) is approximately equal to half of the diameter (D) of the drill head.

7. Deep-hole gundrill according to claim 1, characterized in that a chip breaker having a positive rake angle is formed on the rake surface.

8. Deep-hole gundrill according to claim 1, characterized in that said deep-hole gundrill comprises a driver and a shank, and in that the flute is formed in the drill head and at least in part in the shank.

9. Deep-hole gundrill according to claim 1, characterized in that at least the drill head consists of carbide.

10. Deep-hole gundrill according to claim 1, characterized in that said deep-hole gundrill has at least one guide pad.

11. Deep-hole gundrill according to claim 1, characterized in that both the drill head and the shank consist of carbide.

12. Deep-hole gundrill according to claim 1, characterized in that the drill head is at least in part provided with a hard-material coating.

* * * * *